(12) United States Patent  (10) Patent No.: US 6,607,430 B1
Navarette  (45) Date of Patent: Aug. 19, 2003

(54) FISH CLEANING TOOL

(76) Inventor: Thomas G. Navarette, 761 E. Glenlyn Dr., Azusz, CA (US) 91702

( * ) Notice: Subject to any disclaimer, the term of this patent is extended or adjusted under 35 U.S.C. 154(b) by 0 days.

(21) Appl. No.: 10/145,771

(22) Filed: May 15, 2002

(51) Int. Cl.[7] .............................................. A22C 25/02
(52) U.S. Cl. ...................... 452/105; 452/102; 452/132
(58) Field of Search .......................... 452/98, 102, 103, 452/104, 105, 132, 101, 137; 30/160, 161, 162

(56) References Cited

U.S. PATENT DOCUMENTS

| 717,408 | A | * | 12/1902 | Jacobsen | 452/103 |
|---|---|---|---|---|---|
| 1,475,301 | A | * | 11/1923 | Hartleb | 30/161 |
| 1,935,149 | A | * | 11/1933 | Elvin | 452/103 |
| 2,109,859 | A | | 3/1938 | Cope | |
| 2,279,139 | A | | 4/1942 | Johnson | |
| 2,434,550 | A | * | 1/1948 | Daniel | 43/53.5 |
| 2,510,371 | A | | 6/1950 | Blatt | |
| 2,946,084 | A | * | 7/1960 | Boutillette | 452/128 |
| 3,590,424 | A | * | 7/1971 | Shults | 452/101 |
| 3,748,742 | A | * | 7/1973 | Bigler et al. | 30/294 |
| 3,771,197 | A | * | 11/1973 | Heuer, Sr. | 452/103 |
| 3,996,645 | A | * | 12/1976 | Bordewick | 452/128 |
| 4,054,969 | A | * | 10/1977 | Vogt | 452/132 |
| 4,483,048 | A | * | 11/1984 | Jackson | 452/132 |
| 4,729,150 | A | * | 3/1988 | Breaux et al. | 452/105 |
| 5,230,652 | A | * | 7/1993 | Alam | 452/98 |
| 5,301,428 | A | * | 4/1994 | Wilicox | 30/162 |
| 6,321,454 | B1 | * | 11/2001 | Wass | 30/291 |

FOREIGN PATENT DOCUMENTS

CH      622680    *   4/1981

* cited by examiner

*Primary Examiner*—Peter M. Poon
*Assistant Examiner*—David J Parsley

(57) ABSTRACT

A fish cleaning tool for safely cleaning fish with minimal risk of injury to the user includes a main body having a buoyant handle portion, a head portion, and a neck portion extending between the handle portion and the head portion. The head portion has a convex upper surface with protrusions extending from the convex upper surface for removing scales from a fish when the convex upper surface abrades the fish. A blade extends between a first end of the head portion and the neck portion.

1 Claim, 4 Drawing Sheets

FISH CLEANING TOOL

BACKGROUND OF THE INVENTION

1. Field of the Invention

The present invention relates to fish cleaning devices and more particularly pertains to a new fish cleaning tool for safely cleaning fish with minimal risk of injury to the user.

2. Description of the Prior Art

The use of fish cleaning devices is known in the prior art. U.S. Pat. No. 2,109,859 describes a device having a serrated straight edge for scaling and cleaning fish. Another type of fish cleaning device is U.S. Pat. No. 2,279,139 also having a serrated straight edge for scaling fish. U.S. Pat. No. 2,510,371 also discloses a device having a straight edge for scaling a fish.

While these devices fulfill their respective, particular objectives and requirements, the need remains for a device that includes superior improved features including curved scaling edges and a recessed blade to facilitate slicing a fish open while minimizing the chance for injury.

SUMMARY OF THE INVENTION

The present invention meets the needs presented above by providing a recessed blade, a convex serrated surface for scaling, a spine cleaning protrusion, and a buoyant body to prevent sinking of the device if dropped into water.

Still yet another object of the present invention is to provide a new fish cleaning tool that quickly, easily and safely cleans fish.

Even still another object of the present invention is to provide a new fish cleaning tool that floats in water to prevent accidental loss due to dropping the tool into a body of water.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
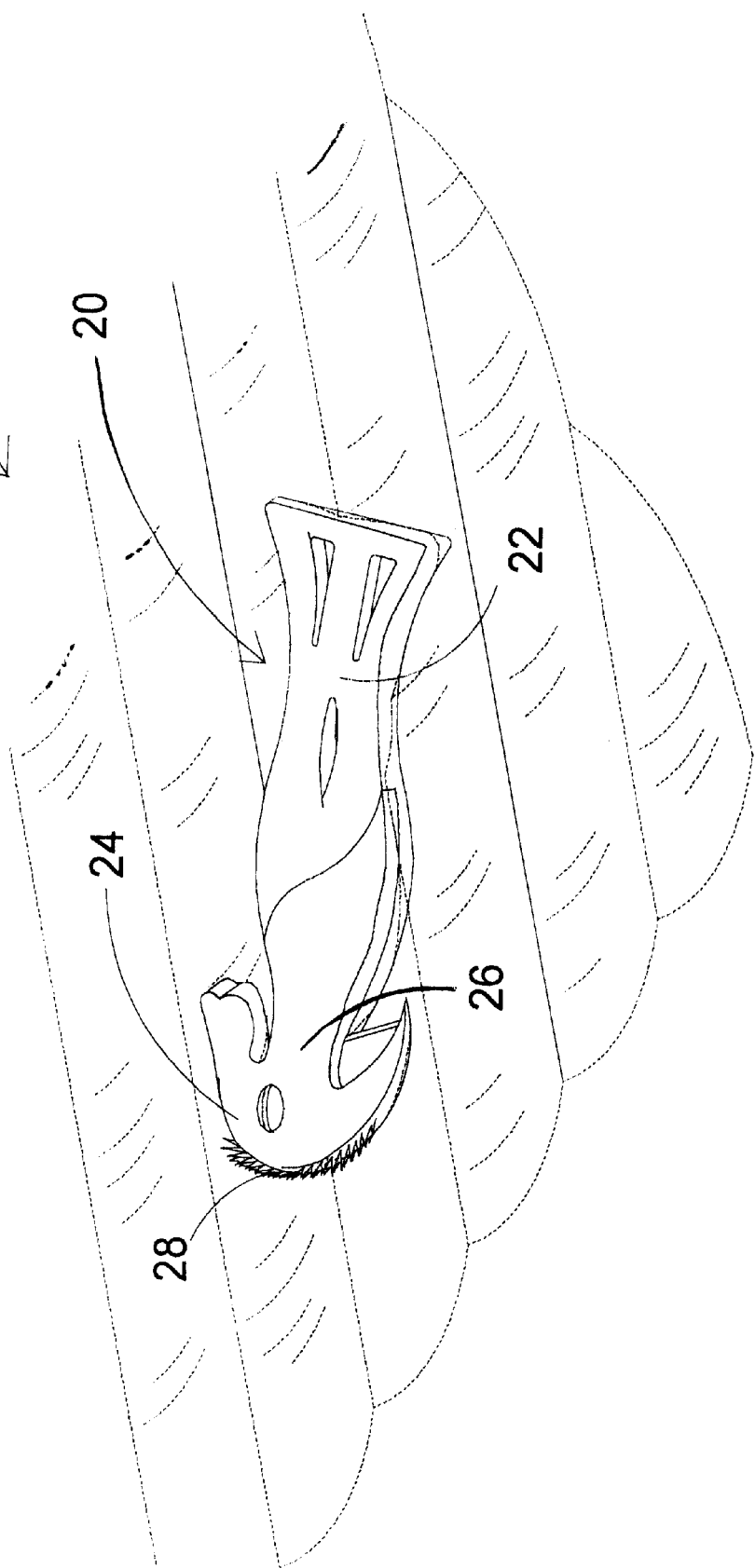
FIG. 1 is a perspective view of a new fish cleaning tool according to the present invention.
Figure 2:
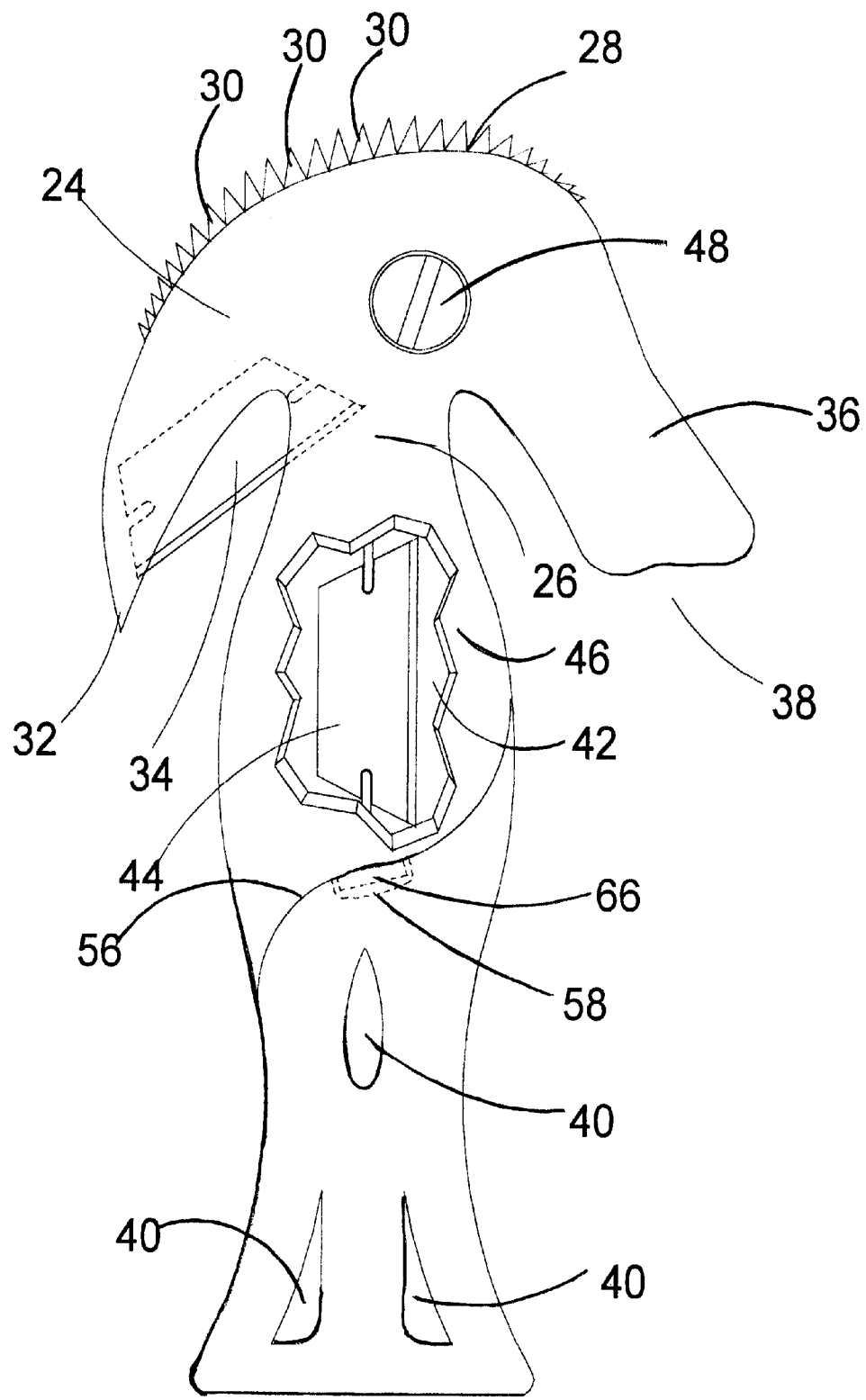
FIG. 2 is a front view of the present invention.
Figure 3:
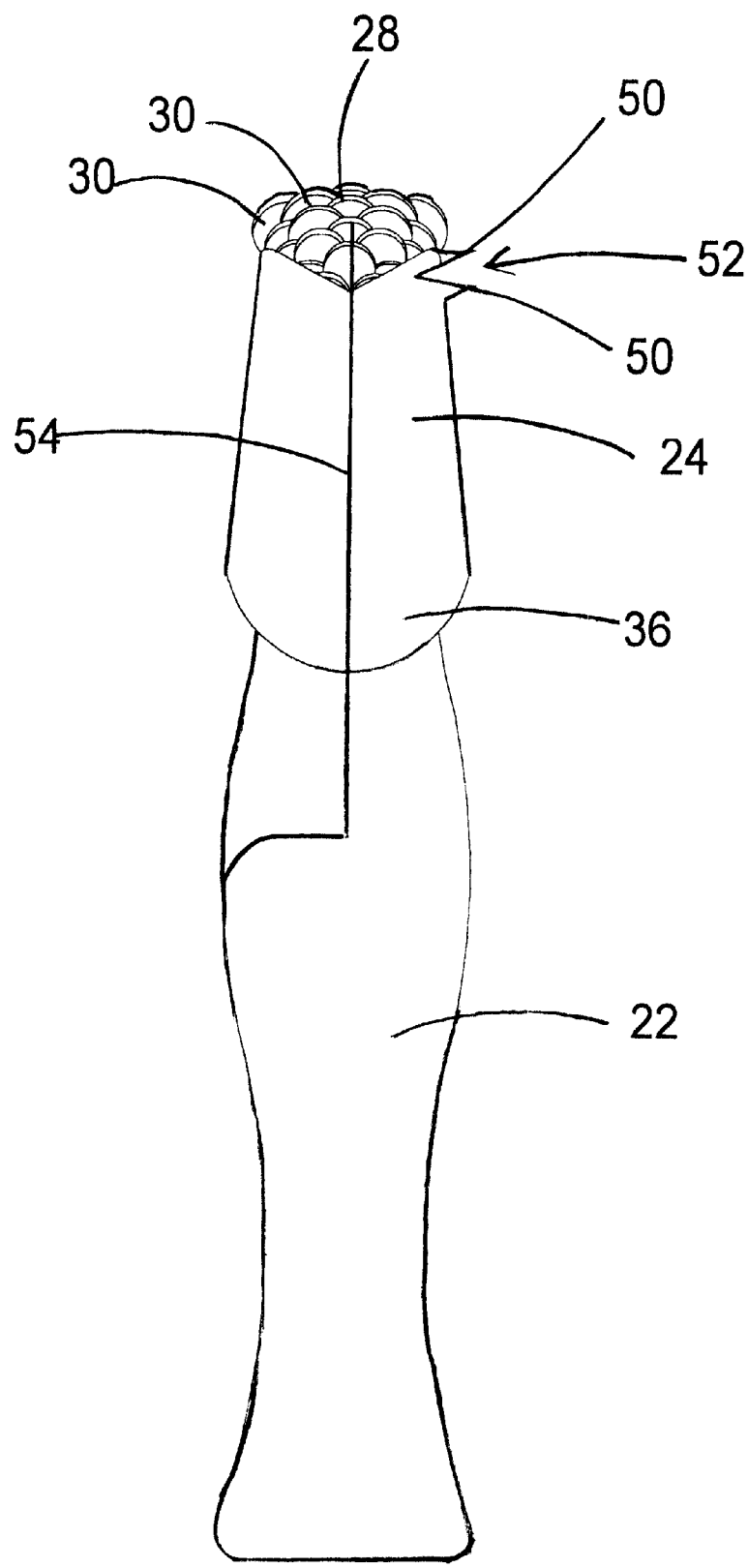
FIG. 3 is a side view of the present invention.
Figure 4:
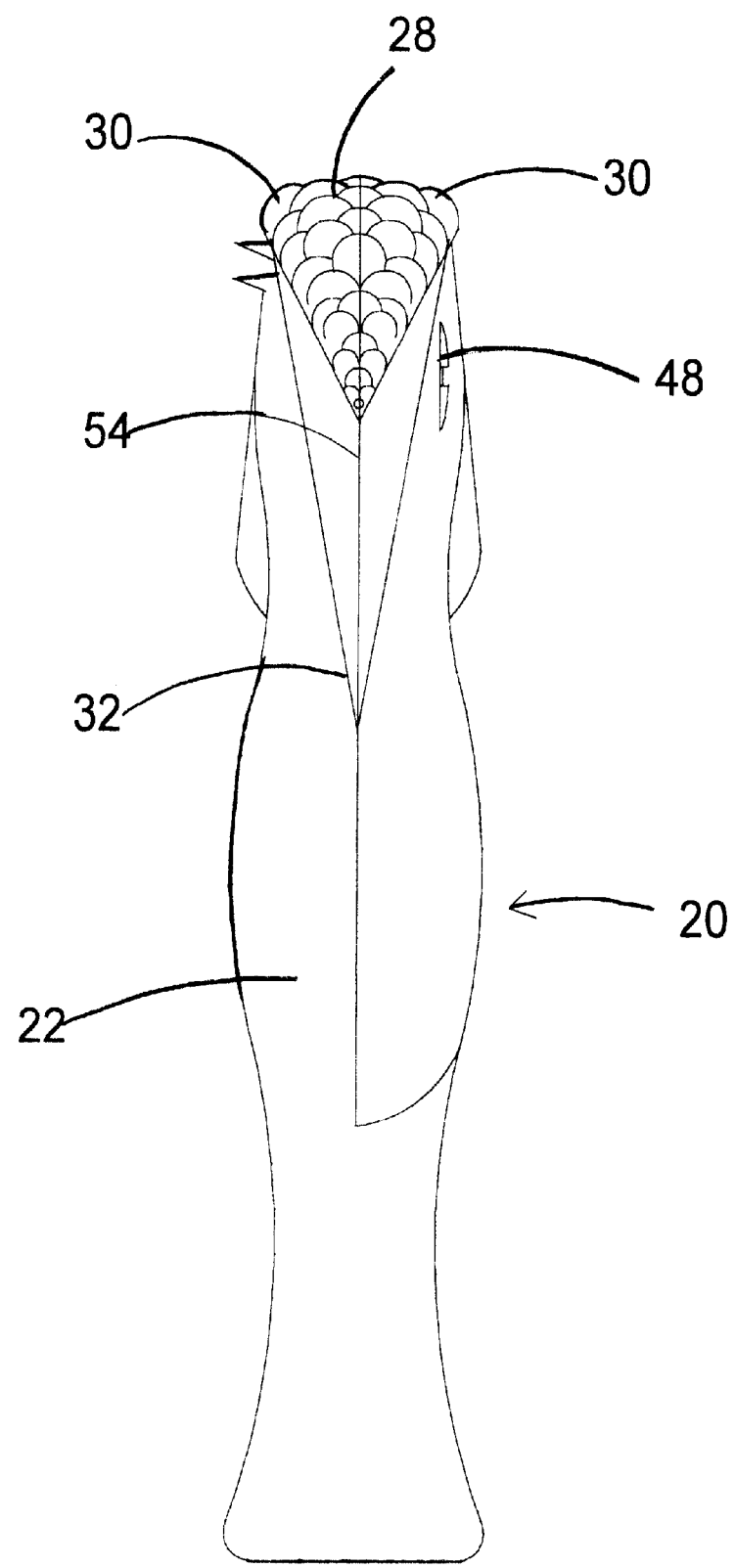
FIG. 4 is a side view of the present invention.

With reference now to the drawings, and in particular to FIGS. 1 through 4 thereof, a new fish cleaning tool embodying the principles and concepts of the present invention and generally designated by the reference numeral 10 will be described.

As best illustrated in FIGS. 1 through 4, the fish cleaning tool 10 generally comprises a main body 20 that includes a buoyant handle portion 22, a head portion 24, and a neck portion 26 extending between the handle portion 22 and the head portion 24.

The head portion 24 has a convex upper surface 28. A plurality of protrusions 30 extend from the convex upper surface 28 whereby the convex upper surface 28 is designed for removing scales from a fish when the convex upper surface 28 abrades the fish.

The head portion 24 includes a first end 32. A blade 34 is coupled to and extends between the first end 32 of the head portion 24 and the neck portion 26.

The head portion 24 includes a second end 36 that extends outwardly from the neck portion 26 and back towards the handle portion 22 to form a spine cleaning hook 38.

In an embodiment, the handle portion 22 includes a plurality of apertures 40 extending through the handle portion 22 for facilitating grasping of the handle portion 22.

The main body 20 has an interior storage compartment 42 for holding a spare blade 44. The main body 20 includes a removable panel 46 for providing access to the storage compartment 42. A screw 48 is insertable through the removable panel 42 and engageable to the main body 20 for securing the removable panel 46 over the storage compartment 42.

A pair of pointed extensions 50 extend from the head portion 24 to form a substantially V-shaped notch 52 for facilitating removal of gills from the fish by inserting the head portion into the gills of the fish and using the extensions 50 to engage and pull out the gills.

The removable panel 46 forms a slit 54 extending through the head portion 24 and the neck portion 26. The screw 48 is positioned for tightening the slit 54 around the blade 34 for securing the blade 34 in the main body 20.

A tab 66 extends from a lower edge 56 of the removable panel 46. The tab 66 is inserted into a recess 58 when the removable panel 46 is secured over the storage compartment 42.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fish cleaning tool comprising:
   a main body having a buoyant handle portion, a head portion, and a neck portion extending between said handle portion and said head portion, said neck portion fixedly coupling said handle portion to said neck portion such that said head portion is static relative to said handle portion;
   said head portion having a convex upper surface extending between opposite side ends of said head portion;
   a plurality of protrusions extending from said convex upper surface whereby said convex upper surface is adapted for removing scales from a fish when said convex upper surface abrades the fish;

said head portion having a first end;

a blade having a sharpened straight edge, said blade being coupled to and extending between said first end of said head portion and said neck portion such that opposite ends of said sharpened straight edge are covered by said main body;

said head portion having a second end, said second end extending outwardly from said neck portion and back towards said handle portion to form a spine cleaning hook adapted for insertion into the fish through gills of the fish;

wherein said handle portion includes a plurality of apertures extending through said handle portion for facilitating grasping of said handle portion;

wherein said main body has an interior storage compartment for holding a spare blade, said main body having a removable panel for providing access to said storage compartment;

a screw insertable through said removable panel and engageable to said main body for securing said removable panel over said storage compartment;

a pair of pointed extensions from said head portion forming a substantially V-shaped notch for facilitating removal of gills from the fish;

wherein said removable panel forms a slit extending through said head portion and said neck portion, said screws being positioned for tightening said slit around said blade for securing said blade in said main body; and a tab extending from a lower edge of said removable panel, said tab being insertable into a recess when said removable panel is secured over said storage compartment.

* * * * *